US011756108B2

(12) United States Patent
Lasater et al.

(10) Patent No.: US 11,756,108 B2
(45) Date of Patent: Sep. 12, 2023

(54) VIRTUAL/AUGMENTED REALITY CUSTOM ORDERING SERVICE

(71) Applicant: NCR Corporation, Atlanta, GA (US)

(72) Inventors: Zachary Taylor Lasater, Atlanta, GA (US); May Hu, Duluth, GA (US); Kelli Lee, Atlanta, GA (US); Kip Oliver Morgan, Atlanta, GA (US)

(73) Assignee: NCR Corporation, Atlanta, GA (US)

(*) Notice: Subject to any disclaimer, the term of this patent is extended or adjusted under 35 U.S.C. 154(b) by 63 days.

(21) Appl. No.: 17/334,246

(22) Filed: May 28, 2021

(65) Prior Publication Data
US 2022/0383399 A1 Dec. 1, 2022

(51) Int. Cl.
*G06Q 30/00* (2023.01)
*G06Q 30/0601* (2023.01)
*G06T 19/00* (2011.01)
*G06Q 50/00* (2012.01)

(52) U.S. Cl.
CPC ..... *G06Q 30/0643* (2013.01); *G06Q 30/0609* (2013.01); *G06Q 30/0633* (2013.01); *G06T 19/006* (2013.01); *G06Q 50/01* (2013.01)

(58) Field of Classification Search
CPC .................................................. G06Q 30/00
See application file for complete search history.

(56) References Cited

U.S. PATENT DOCUMENTS

| 11,334,165 | B1* | 5/2022 | Clements | B66B 1/468 |
| 2018/0207532 | A1* | 7/2018 | Mitchell | A63F 13/335 |
| 2019/0114671 | A1* | 4/2019 | Briggs | G06F 3/04815 |
| 2021/0374884 | A1* | 12/2021 | Cupid | G06Q 30/0635 |

OTHER PUBLICATIONS

Melnick, Kyle, "AR Menues ArChanging the Way We Or", VRScout, dated May 30, 2017. (Year: 2017).*

* cited by examiner

*Primary Examiner* — Mark A Fadok
(74) *Attorney, Agent, or Firm* — Schwegman Lundberg & Woessner, P.A.

(57) ABSTRACT

A customer logs into a desired retailer through a Virtual Reality (VR)/Augmented Reality (AR) cross-retailer application (app). Preferences and/or a profile are obtained from the retailer via an Application Programming Interface (API). A customized VR/AR setting is rendered within the app based on the preferences and/or profile and a VR/AR session is initiated with the app. Consumable items and ingredients of each item are rendered as VR/AR selectable objects during the session for interaction by the customer and a custom item is made with selected ingredients. The customer purchases the item within the session and an order is placed with the retailer through the API. In an embodiment, an avatar of the customer and avatars of other customer placing orders with the retailer are rendered on a virtual floor or superimposed on an actual floor of the customer's physical environment within the app for social interaction and social network features.

20 Claims, 3 Drawing Sheets

VIRTUAL/AUGMENTED REALITY CUSTOM ORDERING SERVICE

BACKGROUND

COVID19 has dramatically changed behaviors of consumers and retailers. Consumers and retailers are now vastly more aware of health safety, which is designed to mitigate the spread of the virus. For example, consumers have been encouraged to stay at home, and when they are unable to stay at home, wear facial coverings and keep at safe physical distances from others while in public, in order to prevent virus transmission. Retailers have reduced consumer capacity, put physical barriers between consumers while dining, stopped serving customers dine-in customers indoors providing on outdoor dining, labeled floors with markers to inform consumers in line what a safe distance is considered to be, etc.

Restaurants, bars, concerts, sporting events, entertainment venues, hotels, and other industries have been temporarily shut down or have had their capacity limits substantially reduced during the pandemic.

Confounding retailer issues surrounding the pandemic was the social unrest that resulted in nationwide protests and which forced many retailers in urban areas across the country to board up their business and shut down to the public completely in some areas.

Now even with the pandemic appearing to end and the protests slowing, some consumers are reluctant to leave their homes out of fear of catching the virus or out of fear for their own personal safety. A measurable percentage of consumers are still unwilling to venture out into crowded urban areas where many retailers have stores.

The businesses that have survived during these turbulent times, experienced a substantial increase in on-line sales associated with delivery orders and pickup orders. They had to rapidly change their business models in the process and deploy more technology than they previously believed necessary.

Unfortunately, consumers are visual and social in nature and the technology associated with online ordering is not visual, not intuitive and does not match the in-person experience. As a result, some consumers still prefer the in-person shopping, but a measurable number of these consumers are still reluctant to re-engage in such activities at the present time. Other consumers that have re-engaged, would likely order online more frequently for convenience reasons, if they were comfortable with the online ordering interfaces and related experiences.

SUMMARY

In various embodiments, methods and a system for Virtual Reality (VR)/Augmented Reality (AR) custom ordering services are presented.

According to an embodiment, a method for operating a VR/AR custom ordering service is provided. For example, a retailer selected by a customer through an application is identified. The customer logs into an account with the retailer using an Application Programming Interface (API) and based on customer-provided credentials within the application. A profile for the customer is obtained from the retailer using the account and the API. Consumable items and ingredients of the consumable items are obtained from the retailer using the API. A VR/AR setting is rendered within the application depicting objects for the consumable items and ingredients. A VR/AR session is established with the customer utilizing the VR/AR setting. An order is received from the customer during the VR/AR session based on selections of the consumable items and the ingredients and the order is placed with the retailer using the API during the VR/AR session.

DETAILED DESCRIPTION

Figure 1:
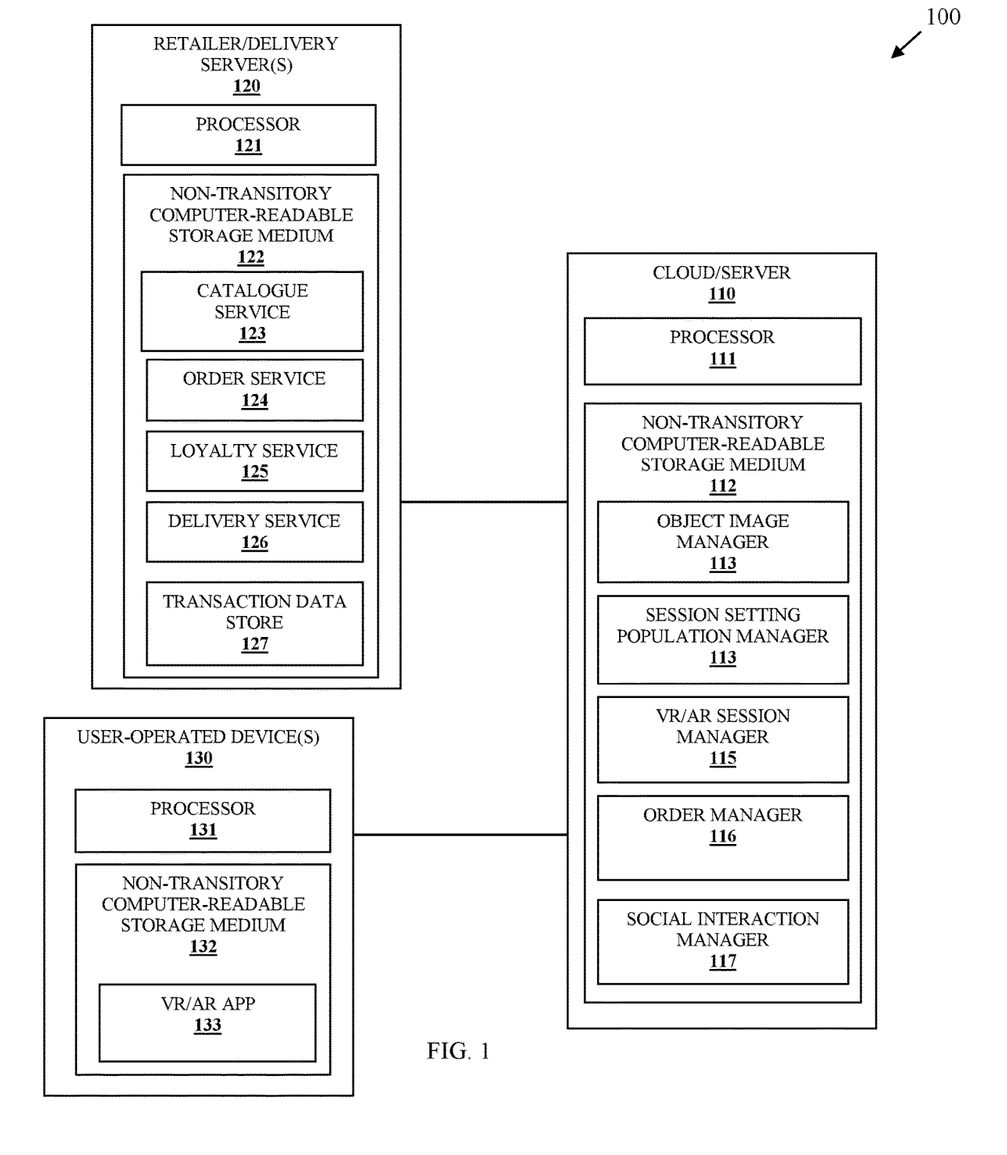
FIG. 1 is a diagram of a system for a VR/AR custom ordering service, according to an example embodiment.

FIG. 1 is a diagram of a system 100 for a VR/AR custom ordering service, according to an example embodiment. It is to be noted that the components are shown schematically in greatly simplified form, with only those components relevant to understanding of the embodiments being illustrated.

Furthermore, the various components (that are identified in the FIG. 1) are illustrated and the arrangement of the components is presented for purposes of illustration only. It is to be noted that other arrangements with more or less components are possible without departing from the teachings of a VR/AR custom ordering service, presented herein and below.

As will be discussed herein and below, methods and a system 100 are provided for dynamically generated VR/AR ordering sessions for custom ordering real-world consumable goods from real-world retailers. The custom order for a consumable good is effortless and interactively constructed by a customer during the session, and the session interface closely approximates an in-person and in-store order experience. Moreover, the retailers' online ordering interface is bypassed and the custom order during the session is automatically placed and confirmed through the session interface by utilizing Application Programming Interfaces (APIs) between the session interface and the existing retailers' online ordering interfaces. Furthermore, customers have an option within the session interface to engage other customers ordering from the same retailer through other VR/AR ordering sessions at the same time that the customer is ordering. In fact, and in some embodiments, social features are provided that are unique to the ordering experience to encourage customers to place more orders through more sessions with the same retailer or with other retailers.

The session interface can be a Virtual Reality (VR) interface or an Augmented Reality (AR) interface in which structures and objects present in the customer's real-world environment at the time of ordering are also present within the session along with rendered virtual objects that can be manipulated and interacted with by the customer during the session.

Images of real-world ingredients used to make desired consumable goods are maintained in a library along with common containers, tools, and structures used when making the consumable goods. These images are associated with VR/AR objects having operations that are processed when selected and/or manipulated by a customer during a session. The VR/AR objects are custom arranged, rendered, and prepopulated within a scene at a start of a session based on known preferences of the customer and a known consumable good/item that the customer desires to interactively make and order during the session.

The setting may include real-world structures and objects within the surroundings of the customer (such as a table, a wall, a piece of furniture, etc. along with video of the customer's arm and hand as it appears in front of a camera of the customer-operated device (this is an AR session). The setting may also just include VR objects and a rendering of a hand or arm appearing within the setting as the user's touch selection mechanism within the setting (this is a VR session).

The customer at a start of a session upon activating the consumer-device application (app), the customer is linked to a registered account with cloud/server 110. The customer is presented with a list of retailers or with types of consumable goods that the customer can make during the session. When the customer selects a specific retailer, the API for logging into the customer's account with that retailer is rendered within the consumer-device app for the customer to log into an account associated with the selected retailers. This gives cloud/server 110 access to the user's account with the selected retailer and allows retrieval of a transaction history, profile, and preferences associated with the customer account with the selected retailer. When the customer selects a type of consumable good rather than a specific retailer, a screen is rendered within the consumer-device app with a subset of retailers associated with the type of consumable good selected by the customer. The customer then selects one of the subset of retailers to make the specific type of consumable good, an API for that retailer is rendered within the consumer-device app and the customer logs into the customer's account with that retailer, giving cloud/server 110 access to the customers transaction history, preferences, and/or profile with that retailer for making the selected type of consumable good.

Cloud/Server 110 uses the API for the retailer that the customer is logged into to obtain the favorite or most frequent types of consumable goods that the customer orders with that retailer by accessing through the API the customer's transaction history, preferences, and/or profile. Moreover, the consumable item catalogue of the retailer can be obtained using the API directly from the retailer's online Point-Of-Sale (POS) system. Furthermore, the ingredients that comprise the most frequently purchased or favorite consumable goods and the ingredients of the retailers consumable goods available through there menu or catalogue are obtained from the POS via the API. The most common ingredients includes in the consumable items of the customer's transaction history with the retailer are pre-selected for initial rendering of the VR/AR session by cloud/server 110.

At this point, the session and the setting is ready to be prepopulated using the objects placed in the setting (VR-based or AR-based). The pre-selected ingredients are mapped to pre-made objects associated with consumable items from the library based on the pre-made objects including a flag/tag for the pre-selected ingredients.

Next, during an AR session as soon as a camera of the consumer device detects a countertop in an environment of the customer within the consumer-device app, a three-dimensional (3D) model of a display shelf is augmented onto the surface of the countertop a short distance away from the customer. The display shelf has 3 levels (as one example) on it for placing 3D models of the categories of consumable goods associated with the customer's favorites and the corresponding ingredients needed for each category.

To the left of the shelf with the session, the bases (consumable base ingredients) are shown to the customer based on the categories in the digital menu of the selected retailer. For example, a coffee shop typically has iced drinks, hot drinks, frozen drinks, bottled drinks (three categories of coffee with coffee being a type of consumable good/item. Basic 3D renderings of these categories are placed in way so the user can touch them in augmented reality or touch on a touchscreen of the consumer-device during a VR session. To register a touch in AR session, a straight line (ray) at the angle of the camera of the consumer device is extended until it intersects with a 3D object. If the customer touches a base such as 'iced drinks' the first row of the shelf shows 3D renderings of objects matching items in that category. For example, if the customer touches hot drinks, the items in that category show 3D renderings on the shelf. If the customer touches the coffee item, a coffee cup appears in front of the shelf indicating the current drink in progress. The ingredients commonly put into a coffee from that customer are rendered on the 2nd level of the display shelf. As the customer touches these, they begin to surround the current drink in progress. If the customer touches the object near the drink in progress, it is removed. On the 3rd level of the shelf, modifiers such as milk, Splenda, cinnamon, that the customer normally modifies their drink with are presented. These can be removed from the drink in progress by touching them in AR manner (extending hand in straight line in front of the camera of the consumer device for detection and overlapping the selected object to simulate a real touch).

Continuing with the coffee example, when the customer is satisfied with their drink build, consisting of a category, item, ingredients and modifiers, they touch an espresso machine object, a sound plays, and a completed representation of the drink appears near a 3D rendering of a register object. The customer can complete several drinks if desired, and their renderings appear near the coffee shop register. If a customer wants to remove a drink from the order, the customer touches a drink, a confirmation popup is rendered, the drink disappears and is removed from the order.

When the order is ready to be placed during the session, the customer touches a simulated register object within the session, a cashier sound plays, and the order is submitted to that retailer for that customer using the API associated with that retailer by cloud/server 110. The customer confirms payment, and a default registered payment card/account associated with the retailer is applied using the API and interacting with the retailer's POS system to place the order via the customer's account with the retailer.

Additionally, to meet others at the same retailer where the customer custom-made a consumable item (coffee shop in the present example), the consumer-device app checks who else is building consumable items with the retailer where the customer placed the order. If the customer and the other customers (who are engaged in other VR/AR sessions around the same time that the customer was) have registered avatars, the setting within the sessions changes and a rendering is provided on a floor of the person ordering the drink (with AR sessions and a VR-rendered floor with VR session) with the corresponding avatars presented on the floor. If the customer touches one of the avatars (AR through extending hand or VR touch on the screen of the consumer device), a chat window opens, and the customer can talk with the selected other customer in real time. The chats can be entered via voice input and transcribed into text within the chat box or the chats can be completely voice based. Only those customers that have selected to meet other customers will see the avatars and can be seen within the virtual retailer store.

A variety of other features and functions are also provided through system 100 from what was discussed above, the above-discussed embodiments and other embodiments are now discussed with reference to the components of system 100.

As will be more completely illustrated herein and below, the customer is completely immersed within a customized VR/AR setting during the VR/AR session with a customer-determined level of real time interaction with other customers or with a completely private customer consumable item making and ordering experience.

As used herein the terms "user," "consumer," "customer," and/or "shopper" may be used interchangeably or synonymously. These terms refer to an individual engaged in a custom ordering activity within a dynamically rendered VR/AR setting during a VR/AR session.

A "VR setting" refers to animated scenes/images/graphics comprising images of real-world items, avatars, floors, shelves, terminals, consumable items, display cases, chairs, fixtures, decorations, display monitors, structures, designs, text, audio, video, etc. The VR setting may also comprise one or more selectable VR rooms. Each VR room providing a particular social interaction feature between customers that are present in a selected VR room at a given moment in time, each customer uniquely identified within the VR room by a unique customer selected avatar. A model provides the structure and arrangement to render the animated scenes/images/graphics within a VR interface to a consumer.

An "AR setting" refers to a combination of VR and actual physical objects that are in the physical environment of the user, such that VR objects are rendered, viewable, and selectable within a field of view of a camera integrated into the consumer device. An AR session is a mixing of the real-world environment of the customer with VR rendered objects selectable and interacted with when the customer extends their hand or arm in front of the field of view of the camera and simulates a touch on an VR-rendered object.

Both "VR session" and "AR session" are an interactive network simulation of a real-world custom ordering or making of a consumable item/good driven by a given customer within a given dynamically rendered VR setting or AR setting. The VR/AR setting may comprise the customer visiting or interacting on a virtually-rendered floor (for VR setting) or on a real floor of the customer's physical environment (for AR setting) with virtual renderings of the customers. Each customer may be making and ordering their own customized consumable item in their own independent VR/AR session associated with a same retailer or a same retailer store; once authorized by each of the customers after placing their corresponding orders with the retailer, the customers visually see and/or audibly hear one another through their corresponding avatars.

The system 100 comprises a cloud/server 110, a plurality of retailer/delivery servers 120, and a plurality of user-operated devices 130.

Cloud/server 110 comprises at least one processor 111 and a non-transitory computer-readable storage medium 112. Medium 112 comprises executable instructions for an object image manager 112, a session setting population manager 113, a VR/AR session manager 115, an order manager 116, and a social interaction manager 117. When the executable instructions are provided to and executed by processor 111, this cause processor 111 to perform the processing discussed herein and below with respect to 113-117.

Each retailer/delivery server 120 comprises at least one processor 121 and a non-transitory computer-readable storage medium 122. Medium 122 comprises executable instructions for a catalogue service 123, an order service 124, a loyalty service 125, and a delivery service. When the executable instructions are provided to and executed by processor 121, this causes processor 121 to perform operations discussed herein and below with respect to 123-126. Medium 122 also comprises a transaction data store comprising transaction history data and transaction metrics.

Each user-operated device 130 comprises at least one processor 131 and a non-transitory computer-readable storage medium 132. Medium 132 comprises executable instructions for a VR/AR application 133. When the executable instructions are provided to and executed by processor 131, this causes processor 131 to perform operations discussed herein and below with respect to VR interface 133.

Object image manager 113 maintains linkages or mappings between item codes for consumable items that are offered by the retailers and that are defined within the corresponding catalogue service 123, corresponding item ingredients for each item identifier/code, and a model image of each corresponding consumable item, Object image manager 113 also maintains images for a variety of structures, floors, walls, ceilings, chairs, shelves, display cases, display monitors, terminals, scanners, checkout stations, wall decorations, doors, etc. Furthermore, object image manager 113 maintains audio snippets for common store sounds, such as and by way of example, beeps and buzzes associated with terminals, scanners, door sensors; crowd background chatter, canned announcements, etc. Object image manager 113 also maintains base images and image features of avatars.

Session setting population manager 113 renders a VR setting dynamically or an AR setting dynamically based on needed consumable items and needed ingredients for each consumable item associated with a given retailer that the customer is logged into during the VR/AR session. Session setting population manager 113 also renders any structures and specialized objects within the setting and arranges the consumable item objects, ingredient objects, structure objects, and specialized objects (such as shelves, cash register, etc.) within the setting. The images for the objects are obtained from the object image manager 113 and some images for VR sessions are obtained live from the camera feed of the user-operated device 130. Moreover, any registered customer avatar may be obtained from the object image manager 113. A model defines the starting or initial the layout and structure of the VR/AR setting which session setting population manager 133 uses to layout the consumable item images, corresponding item ingredients, avatar images, and the structure images (again some structures may be live streams of the user's environment captured by a camera of user-operated device 130 for AR sessions.

VR/AR session manager 115 interacts with VR/AR app 133 for purposes of defining a VR/AR session by signing a user into a selected retailer using an API; obtaining the user's transaction history, preferences, and profile with that retailer using the API, providing the item identifiers so the session setting population manager 113 for the menu of the retailer and the select item identifiers for the favorite consumable items of the user known to the retailer based on the transaction history, preferences, and profile of the user; receiving an initial populated VR/AR session back from the session setting population manager 113, and monitoring and transitioning states of the session based on user selections and interactions during the session. Each object or type of object has functions that can be activated during the session based on customer input or action during the VR/AR session. VR/AR session manager 115 processes the functions to cause the location of the images to change within the setting and to cause actions, such as add an ingredient to the order, remove an ingredient from the order, place a customized order with the retailer, show the avatars of other customers associated with other orders and other sessions with the retailer, show item nutrition information, show item price, show item ingredients, activate an item search, display item discounts, show customer loyalty account information, activate an assistant avatar or chatbot through social interaction manager 117, initiate transaction payment for an order of the customer through transaction manager 116 using the API, activate real-time audio of text chat between customers associated with different VR sessions but both present on a floor within the setting, traverse the setting in a user-defined direction, etc. The state of the VR/AR setting changes as actions are taken by the customer during the VR/AR session and the state changes are managed by VR/AR session manager 115. During the session, the current contents of item identifiers for items selected by the customer for placement in the customer's order are tracked and maintained by VR/AR session manager 115.

VR/AR app 133 allows the customer to navigate the VR/AR setting during a session through a pointer object that is rendered within the animated stream of the store and controlled by the customer (during a VR session) and through actual movement and placement of the customer's arm and hand in front of the field of view of the camera for user-operated device (during an AR session). In other cases, when user-operated device 130 includes VR/AR input devices, Touches (real touches in VR sessions and simulated touches in AR sessions) by the customer on an item and/or an item ingredient within the VR/AR app 133 causes the item or ingredient to be selected, added to an order, or removed from the order; a touch and hold displays item nutrition and pricing information; etc. It is noted that these are sample interactions and other interactions, types of touches, or natural language instructions spoken by the customer during the VR/AR session can be used by VR/AR session manager 115 to detect and process customer interaction with the items and item ingredients of the retailer and navigate the customer through the customized order of a consumable item.

VR/AR interface 133 also provides a menu of selectable options within controls that are always within view of the customer within the VR/AR setting. Some of these selectable options may include search for items, search for ingredients, look for alternative ingredients to a unavailable or to a undesired ingredient, compare multiple items or ingredients, display current contents of an order and pricing, display ingredients of each item in the order, display loyalty account and points of the customer with the retailer, request an automated chatbot for assistance, etc. VR/AR app 133 may also allow the customer to change the items and/or item ingredients available from the retailer by applying selectable filters, such as populate the items and item ingredients with just vegan compliant selections, just gluten-free selections, low sugar or low salt selections, etc. Any filter causes VR/AR session manager 115 to interact with catalogue service 123 and session setting population manager 113 to repopulate the VR/AR setting back to an initial state with the requested filters applied such that just the items that meet the filter criteria are populated in the setting.

When the customer touches a cash register object within the setting, VR/AR session manager 115 interprets this as a desire for the customer to checkout with the retailer with the current state of the order. VR/AR session manager 115 uses the retailer's API to place the order with order service 124 of the retailer. A registered card of the customer with the retailer can be obtained using the API from the customer's profile with the retailer. Any loyalty points received for the order and current total of loyalty points can be displayed within the setting and any desired receipt can be sent to the customer via a registered contact address (email, phone via text, etc.). If the order was for delivery, VR/AR session manager 115 sends the order details to delivery service 126 using the order details. If the order is for pickup, the order fulfillment status information is presented within the setting to the customer (e.g., pickup in 15 minutes at store X). The VR/AR session manager 115 then asks the customer through an option or through automated speech whether the customer would like to interact with other customers that have placed orders with the store through the customer's registered avatar with cloud/server 110.

If the customer confirms that the customer wants to socially interact with other customers, VR/AR session manager 115 engages social interaction manager 117 and updates the setting such that a rendered floor depicts an animation of the other customers currently waiting on orders to be fulfilled with the retailer or with a specific store of the retailer. The floor may be the actual floor of the customer's physical environment in an AR session with the customer avatars virtually rendered onto the actual video stream of the real floor. Using VR or AR selection, the customer can touch any of the customers to engage that customer. Social interaction manager 117 displays a chat box or engages a two-way audio conference between the two customers for a dialogue either via speech or via text. When a customer is selected for interaction 117, their avatar name and any details about that customer that was authorized to be presented are displayed to the other touching customer.

Social interaction manager 117 may also enable a variety of social networking features such as, maintaining a favorite made consumable item of each customer as a customer-assigned name along with its ingredients. A different customer can select this customer-assigned name for ordering with a corresponding instance of the VR/AR session manager. Social interaction manager 117 may also maintain social network-based metrics for each retailer and the customers that form that social network for that retailer. One metric may be a total number of times a specific customer-named item was ordered within a given period of time, a running tally by most ordered item by customer-named items within the network, etc. The retailer associated with any given social network may also deploy promotions or games via social interaction manager 117, such as a free item when a consumer-made and consumer-named item is purchased X times, adding the consumer-made and consumer-named item to the store menu, etc. Social interaction manager 117 may also allow customer-made items and the corresponding ingredients to be shared within the social network by the customer, likes of the sharing can be tabulated and shown, etc.

It is to be noted that the above-noted embodiments can be deployed for any retailer associated with consumable items, such as coffee shops, bars, pizza parlors, salad shops, sandwich shops, pasta shops, etc. In fact, any establishment that allows customization of a consumable item can deploy the teachings presented herein.

The above-mentioned features are only a subset of available features with system 100. Some additional features are now discussed within the above-noted context.

Some items rendered within the VR/AR session may be premade and selectable for ordering such that the customer ordering or selection of ingredients is not needed by the customer during the session.

The custom-made consumable item as assembled by the customer can be rendered for viewing on a VR-rendered countertop or superimposed on an actual live stream of the customers actual countertop for viewing by the customer once completed.

The VR/AR setting may present other selections such as your drinks made, top picks, specials, most popular right now. A ticker display may change the most popular as orders are being received and show the popular consumable items and corresponding order counts in real time on the ticker display.

A running ticker of the customer's order and/or ingredients of each consumable item may be presented within the setting during the session and selectable to remove or modify a given item or a given ingredient of a given item.

In an embodiment, the user-operated device 130 is a phone, wearable glasses or goggles, a tablet, a laptop, a watch, a desktop, or a specifically enabled VR/AR device.

In an embodiment, VR/AR app 133 is a new app added to an existing VR/AR system as a new app which interacts with cloud/server 110, such as and by way of example only a new app added to Oculus Quest®, Wii®, Xbox®, PlayStation®, etc.

Figure 2:
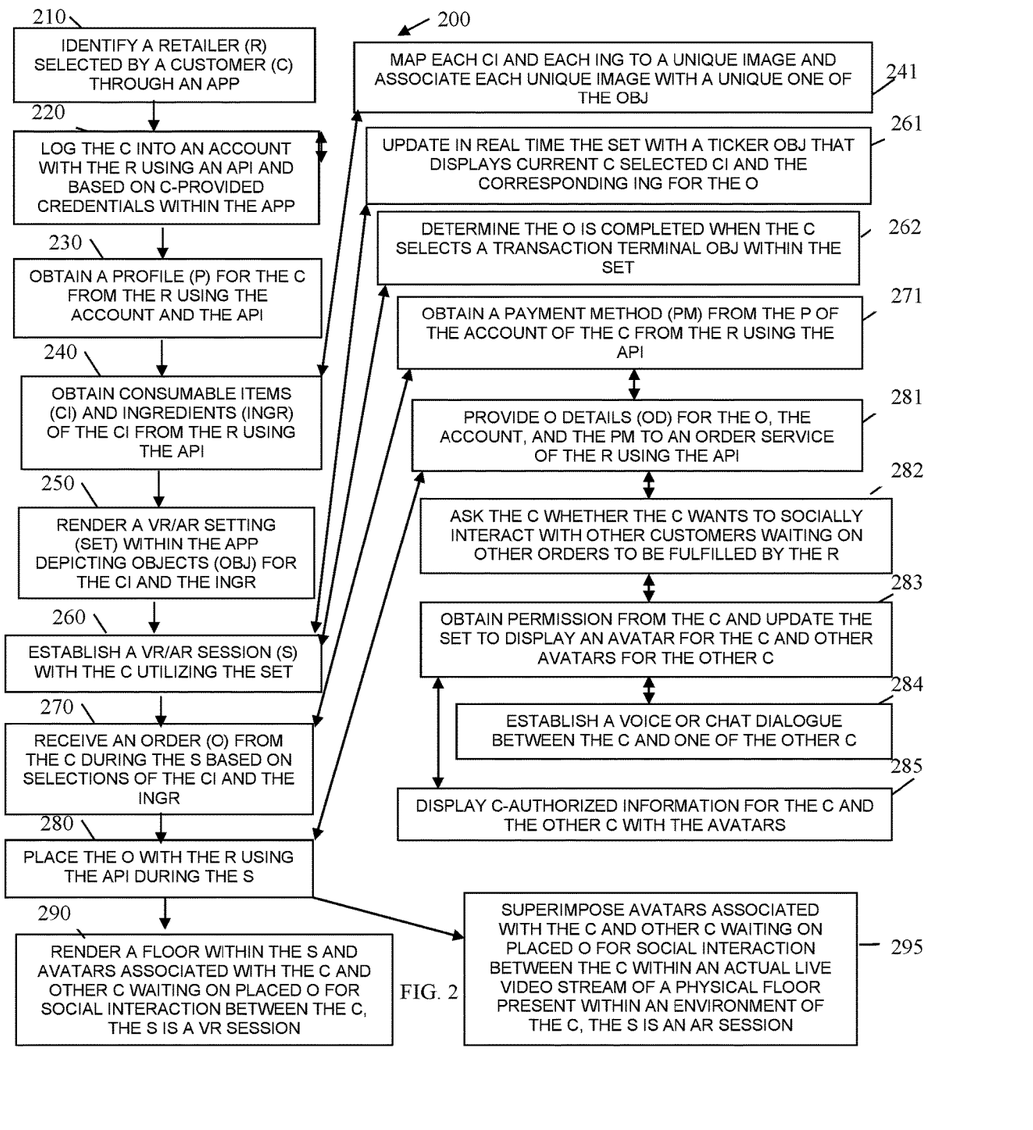
FIG. 2 is a diagram of a method for operating a VR/AR custom ordering service, according to an example embodiment.
Figure 3:
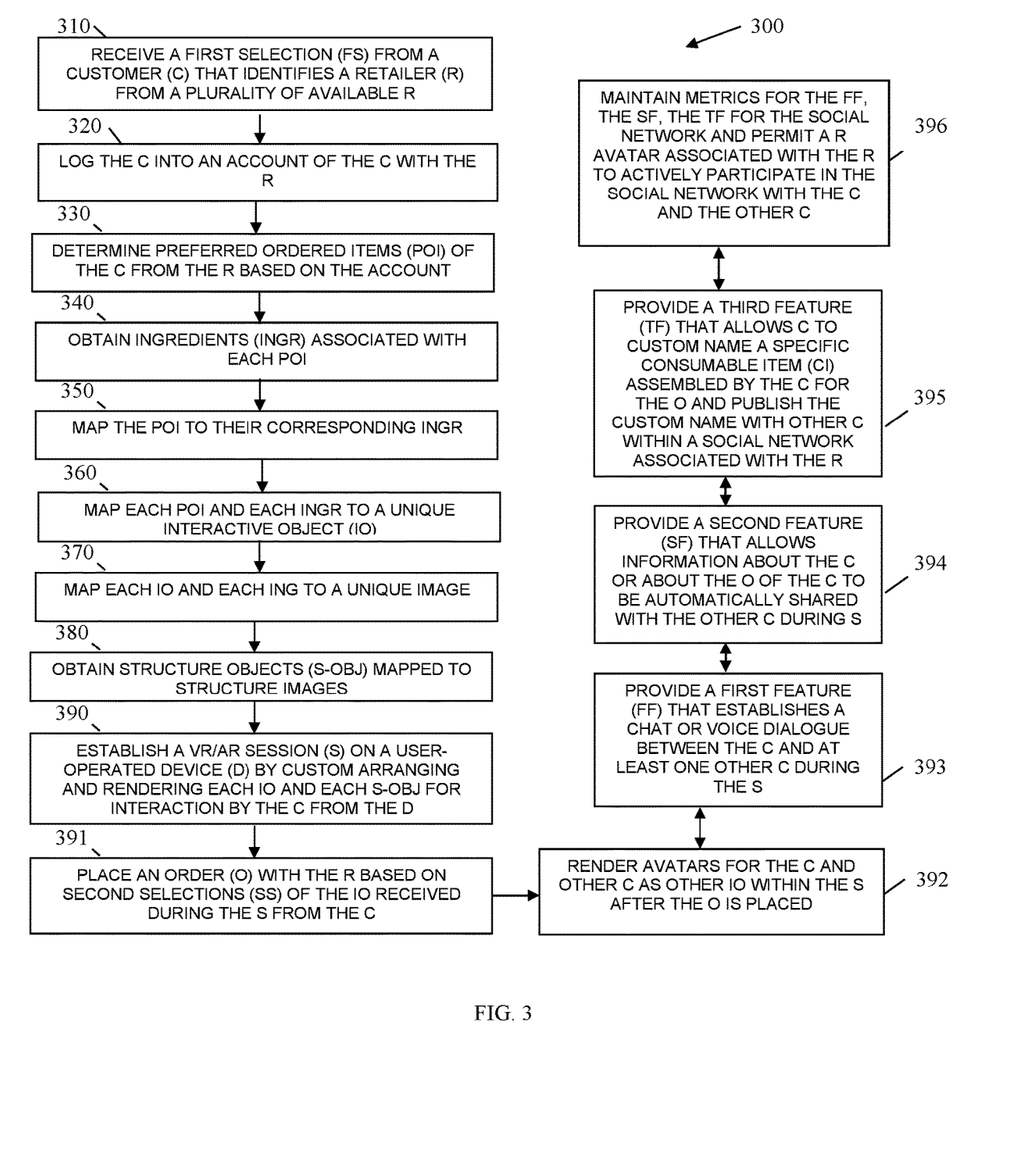
FIG. 3 is a diagram of another method for operating a VR/AR custom ordering service, according to an example embodiment.

The above referenced embodiments and other embodiments are now discussed with FIGS. 2-3.

FIG. 2 is a diagram of a method 200 for operating a VR/AR custom ordering service, according to an example embodiment. The software module(s) that implements the method 200 is referred to as a "VR/AR custom ordering service." The VR/AR custom ordering service is implemented as executable instructions programmed and residing within memory and/or a non-transitory computer-readable (processor-readable) storage medium and executed by one or more processors of one or more devices. The processor(s) of the device(s) that executes the VR/AR custom ordering service are specifically configured and programmed to process the VR/AR custom ordering service. The VR/AR custom ordering service may have access to one or more network connections during its processing. The network connections can be wired, wireless, or a combination of wired and wireless.

In an embodiment, the VR/AR custom ordering service executes on cloud 110. The cloud 110 comprises one or more servers that are logically assembled and cooperate as a single server.

In an embodiment, the VR/AR custom ordering service executes on a combination of cloud 110 and servers 120.

In an embodiment, the VR/AR custom ordering service is all of or some combination of 113-117 and/or 123-127.

At 210, the VR/AR custom ordering service identifies a retailer selected by a customer through an application 133.

At 220, the VR/AR custom ordering service logs the customer into an account with the retailer using an API and based on customer-provided credentials within the application 133.

At 230, the VR/AR custom ordering service obtains a provide for the customer from the retailer using the account and the API.

At 240, the VR/AR custom ordering service obtains consumable items and ingredients of the consumable items from the retailer using the API.

In an embodiment, at 241, the VR/AR custom ordering service maps each consumable item and each ingredient to a unique image and associates each unique image with a unique interactive VR/AR object.

At 250, the VR/AR custom ordering service renders a VR/AR setting within the app 133 that depicts the interactive VR/AR objects for the consumable items and the corresponding ingredients associated with each consumable item.

At 260, the VR/AR custom ordering service establishes a VR/AR session with the customer utilizing the VR/AR setting.

In an embodiment, at 261, the VR/AR custom ordering service updates, in real time, the VR/AR setting with a ticker object that displays current customer selected consumable items and the corresponding ingredients for an order of the customer with the retailer. The order comprises at least one custom assembled consumable item made by the customer during the VR/AR session using the ingredients.

In an embodiment, at 262, the VR/AR custom ordering service determines that the order is completed when the customer selects a transaction terminal object rendered within the VR/AR setting.

At 270, the VR/AR custom ordering service receives the order from the customer during the VR/AR session based on selections of the consumable items and the ingredients made by the customer during the session.

In an embodiment, at 271, the VR/AR custom ordering service obtains a payment method from the profile of the account for the customer from the retailer using the API.

At 280, the VR/AR custom ordering service places the order with the retailer using the API during the VR/AR session.

In an embodiment of 271 and 280, at 281, the VR/AR custom ordering service provides order details for the order, the account, and the payment method to an order service 124 of the retailer using the API.

In an embodiment of 281 and at 282, the VR/AR custom ordering service asks the customer whether the customer wants to socially interact with other customers waiting on orders to be fulfilled by the retailer.

In an embodiment of 282 and at 283, the VR/AR custom ordering service obtains a permission from the customer and updates the VR/AR setting to display an avatar for the customer and other avatars for the other customers.

In an embodiment of 283 and at 284, the VR/AR custom ordering service establishes a voice or chat dialogue between the customer and at least one of the other customers.

In an embodiment of 283 and at 285, the VR/AR custom ordering service displays customer-authorized information for the customer and the other customers with the avatar and with the other avatars.

In an embodiment, at 290, the VR/AR custom ordering service renders a floor within the VR/AR session and avatars associated with the customer and other customers waiting on placed orders for social interaction between the customer and the other customers. In this embodiment, the VR/AR session is a VR session.

In an embodiment, at 295, the VR/AR custom ordering service superimposes avatars associated with the customer and other customers waiting on placed orders for social interaction between the customers within an actual live video stream of a physical floor present within a physical environment of the customer. In this embodiment, the VR/AR session is an AR session.

FIG. 3 is a diagram of a method 300 for operating a VR/AR custom ordering service, according to an example embodiment. The software module(s) that implements the method 300 is referred to as a "custom VR/AR order manager." The custom VR/AR order manager is implemented as executable instructions programmed and residing within memory and/or a non-transitory computer-readable (processor-readable) storage medium and executed by one or more processors of one or more devices. The processor(s) of the device(s) that executes the custom VR/AR order manager are specifically configured and programmed to process the custom VR/AR order manager. The custom VR/AR order manager may have access to one or more network connections during its processing. The network connections can be wired, wireless, or a combination of wired and wireless.

In an embodiment, the custom VR/AR order manager executes on cloud 110.

In an embodiment, the custom VR/AR order manager executes on a combination of cloud 110 and servers 120.

In an embodiment, the custom VR/AR order manager is all of, or some combination of 113-117, 123-127, and/or the method 200.

The custom VR/AR order manager represents another and, in some ways, an enhanced processing perspective from that which was discussed above with method 200 and/or system 100.

At 310, the custom VR/AR order manager receives a first selection from a customer that identifies a retailer from a plurality of available retailers.

At 320, the custom VR/AR order manager logs the customer into an account of the customer with the retailer.

At 330, the custom VR/AR order manager determined preferred ordered items of the customer from the retailer based on information associated with the account of the customer with the retailer.

At 340, the custom VR/AR order manager obtains ingredients associated with each preferred ordered item.

At 350, the custom VR/AR order manager maps the preferred ordered items to their corresponding ingredients.

At 360, the custom VR/AR order manager maps each preferred ordered item and each ingredient to a unique interactive VR/AR object.

At 370, the custom VR/AR order manager maps each unique interactive VR/AR object to a unique image.

At 380, the custom VR/AR order manager obtains structure objects mapped to structure images. For example, a multi-layer shelf, a countertop, a wall, a floor, etc.

At 390, the custom VR/AR order manager establishes a VR/AR session on a user-operated device by custom arranging, organizing, and rendering each interactive VR/AR object and each structure object for interaction by the customer from the user-operated device.

At 391, the custom VR/AR order manager places an order with the retailer based on second selections of the interactive VR/AR objects received during the VR/AR session from the customer.

In an embodiment, at 392, the custom VR/AR order manager renders avatars for the customer and for other customers as other interactive VR/AR objects within the VR/AR session after the order is placed with the retailer.

In an embodiment of 392 and at 393, the custom VR/AR order manager provides a first feature that establishes a real-time and interactive chat or voice dialogue between the customer and at least one other customer during the VR/AR session.

In an embodiment of 393 and at 394, the custom VR/AR order manager provides a second feature that allows information about the customer or about the order of the customer to be automatically shared with the other customers during the VR/AR session.

In an embodiment of 394 and at 395, the custom VR/AR order manager provides a third feature that allows the customer to custom name a specific consumable item assembled by the customer for the order and the custom VR/AR order manager publishes the custom name with the other customers within a social network associated with the retailer.

In an embodiment of 395 and at 396, the custom VR/AR order manager maintains metrics for the first features, the second features, and the third features and the custom VR/AR order manager permits a retailer avatar associated with the retailer to actively participate in the social network with the customer and the other customers. In an embodiment, the retailer provides rewards, promotions, and/or games through the retailer avatar within the social network.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:
presenting types of consumable foods available to a customer for ordering through an application;
presenting a subset of retailers within the application for a retailer selection based on a selected type of consumable food made by the customer through the application;
identifying a retailer selected by the customer through the application based on the subset of retailers presented within the application to the consumer;
logging the customer into an account with the retailer via the application using an Application Programming Interface (API) and customer-provided credentials with the retailer selected;
obtaining a profile, a transaction history, and preferences of the customer from the retailer using the API to access the account the consumer logged into via the application;
presenting most frequent types of consumable goods that the customer has ordered with the retailer using the API, the transaction history, the profile, and the preferences;
obtaining consumable items and ingredients of the consumable items from the retailer using the API based on customer selections from the most frequent types of consumable goods within the application;

rendering a Virtual Reality (VR)/Augmented Reality (AR) setting within the application depicting objects for the consumable items and ingredients;

establishing a VR/AR session with the customer utilizing the VR/AR setting;

receiving an order from the customer during the VR/AR session based on selections of the consumable items and the ingredients; and placing the order with the retailer using the API during the VR/AR session.

2. The method of claim 1 further comprising, rendering a floor within the VR/AR session and avatars associated with the customer and other customers waiting on placed orders for social interaction between the customer and the other customers, wherein the VR/AR session is a VR session.

3. The method of claim 1 further comprising, superimposing avatars associated with the customer and other customers waiting on placed orders for social interaction between the customer and the other customers within an actual video stream of a physical floor present in an environment of the customer, wherein the VR/AR session is an AR session.

4. The method of claim 1, wherein obtaining the consumable items and the ingredients further includes mapping each consumable item and each ingredient to a unique image and associating each unique image with a unique one of the objects.

5. The method of claim 1, wherein establishing further includes updating in real time the VR/AR setting with a ticker object that displays customer selected consumable items and the corresponding ingredients for the order.

6. The method of claim 1, wherein establishing further includes determining the order is completed when the customer selects a transaction terminal object within the VR/AR setting.

7. The method of claim 1, wherein receiving further includes obtaining a payment method from the profile of the account of the customer from the retailer using the API.

8. The method of claim 7, wherein placing further includes providing order details for the order, the account, and the payment method to an order service of the retailer using the API.

9. The method of claim 8, wherein providing further includes asking the customer whether the customer wants to socially interact with other customers waiting on other orders to be fulfilled by the retailer.

10. The method of claim 9, wherein asking further includes receiving a permission from the customer and updating the VR/AR setting to display an avatar associated with the customer and other avatars associated with the other customers.

11. The method of claim 10, wherein receiving the permission further includes establishing a voice or chat dialogue between the customer and one of the other customers.

12. The method of claim 10, wherein establishing the permission further includes displaying customer-authorized information for the customer and the other customers with the avatar and the other avatars.

13. A method, comprising:
presenting types of consumable foods available to a customer for ordering through an application;
receiving a first selection from a customer that identifies a retailer from a plurality of available retailers associated with a selected type of consumable food made by the customer through the application;
logging the customer into an account of the customer with the retailer through the application;
determining preferred ordered items of the customer from the retailer based on the account, wherein determining further includes obtaining and evaluating a transaction history, a profile, and preferences of the customer with the retailer based on the account of the customer with the retailer to determine the preferred ordered items;
obtaining ingredients associated with each of the preferred ordered items from the retailer;
mapping the preferred ordered items to their corresponding ingredients;
mapping each preferred ordered item and each ingredient to a unique interactive object;
mapping each unique interactive object and each ingredient to a unique image;
obtaining structure objects mapped to structure images;
establishing a Virtual Reality (VR)/Augmented Reality (AR) Session on a user-operated device by custom arranging and rendering each unique interactive object and each structure object for interaction by the customer from the user-operated device; and
placing an order with the retailer based on second selections received during the VR/AR session of the unique interactive from the customer.

14. The method of claim 13 further comprising rendering avatars for the customer and other customers as other interactive objects within the VR/AR session after the order is placed.

15. The method of claim 14, wherein rendering the avatars further includes providing a first feature that establishes a voice or chat dialogue between the customer and at least one other customer during the VR/AR session.

16. The method of claim 15, wherein rendering the avatars further includes providing a second feature that allows information about the customer or about the order of the customer to be automatically shared with the at least one other customer during the VR/AR session.

17. The method of claim 16, wherein rendering the avatars further includes providing a third feature that allows the customer to custom name a specific consumable item assembled by the customer for the order and publish the custom-name with other customers within a social network associated with the retailer.

18. The method of claim 13 further comprising, maintaining metrics for the first feature, the second feature, and the third feature for the social network and permitting a retailer avatar associated with the retailer to actively participate in the social network with the customer and the other customers.

19. A system comprising:
a cloud processing environment comprising at least one server;
the at least one server comprising at least one processor and a non-transitory computer-readable storage medium;
the non-transitory computer-readable storage medium comprising executable instructions; and
the executable instructions when executed by the at least one processor from the non-transitory computer-readable storage medium cause the at least one processor to perform operations comprising:
presenting types of consumable foods available to a customer for ordering through a Virtual Realty (VR)/Augmented Reality (AR) application provided to a customer-operated device;

presenting a subset of retailers within the application for a retailer selection based on a selected type of consumable food made by the customer through the VR/AR application;

logging the customer into an account of the customer with a retailer associated with the retailer selection via an Application Programming Interface through the VR/AR application;

obtaining via the API a transaction history, a profile, and preferences of the customer with the retailer from the account;

custom rendering and custom populating a Virtual Reality (VR)/Augmented Reality (AR) setting with consumable item images for consumable items and ingredient images for ingredients associated with making each consumable item for a customer of the retailer during a VR/AR session with the customer-operated device and the customer via the VR/AR application based on the transaction history, the profile, and the preferences for the customer to custom assembling a customer-defined consumable item using the ingredients during the VR/AR session;

placing an order of the customer for the customer-defined consumable item with the retailer during the VR/AR session;

rendering within the VR/AR setting an avatar for the customer and other avatars for other customers waiting on other orders with the retailer to be fulfilled in other VR/AR sessions for dynamic and real time interaction between the customer and the other customers through features associated with the avatar and the other avatars.

20. The system of claim 19, wherein the customer-operated device is a desktop computer, a laptop computer, a tablet computer, a phone, a wearable processing device, an AR device, or a VR device that comprises at least one VR input device operated by the customer to provide input to the VR interface.

* * * * *